United States Patent [19]

Helgren et al.

[11] Patent Number: 5,245,264
[45] Date of Patent: Sep. 14, 1993

[54] REAL TIME STRAIGHTNESS DEVIATION MEASURING AND COMPENSATION DEVICE FOR MACHINE TOOLS

[75] Inventors: Dale E. Helgren, Green Bay; Thomas J. Doyle, Winneconne, both of Wis.

[73] Assignee: J. M. Voith, GmbH, Heidenheim, Fed. Rep. of Germany

[21] Appl. No.: 856,484

[22] Filed: Mar. 24, 1992

[51] Int. Cl.[5] .................. G05B 19/37; G05B 19/41
[52] U.S. Cl. ..................... 318/568.22; 318/568.24; 318/577; 318/687
[58] Field of Search .................... 318/567-578, 318/687, 640

[56] References Cited

U.S. PATENT DOCUMENTS

| | | | |
|---|---|---|---|
| 3,596,153 | 7/1971 | Brainard et al. | 318/574 |
| 4,273,482 | 6/1981 | Lloyd et al. | 409/80 |
| 4,329,632 | 5/1982 | Yoshida et al. | 318/587 |
| 4,499,546 | 2/1985 | Kuga et al. | 364/474 |
| 4,571,479 | 2/1986 | Maeda et al. | 219/124.34 |
| 4,587,622 | 5/1986 | Herzog | 364/561 |
| 4,655,142 | 4/1987 | Theurer et al. | 104/7.1 |
| 4,878,003 | 10/1989 | Knepper | 318/587 |
| 4,945,501 | 7/1990 | Bell et al. | 364/571.05 |

Primary Examiner—William M. Shoop, Jr.
Assistant Examiner—Brian Sircus
Attorney, Agent, or Firm—Baker & Daniels

[57] ABSTRACT

A real time straightness deviation measuring and compensation device for a machine tool that automatically and continuously compensates for bed way deviation from a truly straight line relative to a workpiece. A wire, parallel to the workpiece or axis of workpiece rotation and perpendicular to the direction of machine tool compensation is utilized as a straightness reference, with the wire being stretched in the direction of machine tool carriage travel and supported on either end by weights for gravity induced straightness. A position indication device, such as a laser micrometer, is attached to the machine tool carriage and positioned around the reference wire in order to read the position of the wire relative to the machine tool carriage during real time operation. An electronically controlled servo motor attached to a machine tool supported on the carriage automatically adjusts the machine tool to compensate for carriage deviation caused by bed way deviation relative to the straight reference wire.

20 Claims, 2 Drawing Sheets

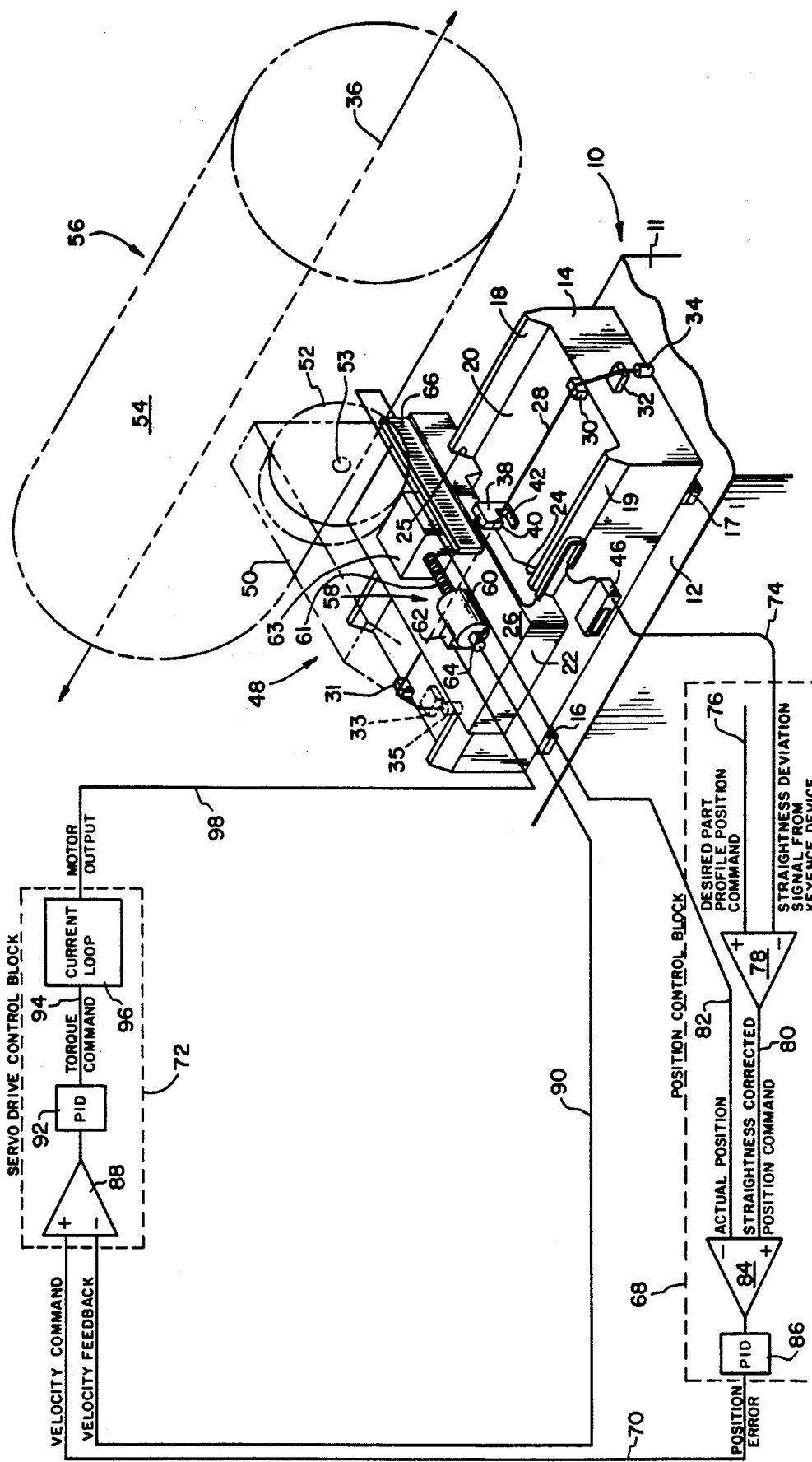

REAL TIME STRAIGHTNESS DEVIATION MEASURING AND COMPENSATION DEVICE FOR MACHINE TOOLS

BACKGROUND OF THE INVENTION

The present invention relates to deviation and compensation devices for machine tools and, in particular to real time straightness deviation measuring and compensation devices for machine tools.

Machine tools are utilized in a wide variety of manufacturing processes and must be able to move through the three mutually perpendicular axes of space with great precision, accuracy, and reliability. In three-dimensional space, the degree of precision, accuracy, and reliability of the machine tool obtainable in the real world is the extent to which its three axes remain perpendicular and straight relative to each other and to the workpiece.

The prior art obtained and maintained relative axes perpendicularity and straightness by fabricating rigid way supports of cast or weldment construction superimposed on a rigid steel reinforced concrete foundation. This provided a secure mounting structure on which were mounted scrapped V-ways or roller ways providing the moving contact with the machine tool carriage. In order to obtain the best possible perpendicularity and straightness, and allow for the adjustment of the ways, adjustment devices such as leveling wedges, side pushers, and hold-down bolts were incorporated in the machine base. These adjustment devices were usually adjusted at installation using a laser interferometer or a wire micrometer to provide perpendicularity and straightness. However, with the prior art adjustment devices it is initially difficult to adjust the bed section using wedges and jacks to obtain movement in the exact magnitude, location, and direction desired. In addition, over time the accuracy of the initial adjustment degrades due to a variety of influences such as settling, temperature change, cutting forces, accidents, and the like. It is thus necessary because of the variety of influences to periodically readjust the machine tool in order to correct and maintain its perpendicularity and straightness.

With the advent of CNC control systems, bed error compensation became available whereby a one-time map of the straightness error was generated by obtained data and entered into a computer. A servo system would compensate the cutting tool to obtain the desired results according to the generated map, thus taking into account the bed error. This worked fairly well when the machine was new. However, since the effects of time generally degrade the validity of the generated bed error data and associated map, the complex process of obtaining new data and generating a new bed error map would have to be repeated.

While the prior art conventional devices are good for many applications, the machine tool, in order to be reliably accurate, must also maintain perpendicularity and straightness through four-dimensional space; that is, in real time. Prior art devices, such as CNC control systems and rigid structural foundations with manually adjustable wedges and jacks, do not compensate for deviations such as cutter/cutting forces, temperature change, and vibration that occur as the machine tool is operating in real time. Because of this, exact perpendicularity and straightness is not maintainable during the period during which the machine tool operates. As an example, bed way deviations from a truly straight path was not heretofore compensatable in real time.

Additionally, the prior art conventional devices are not useful in applications where straightness in the order of a few microns must be maintained over long distances, e.g. 8 to 12 meters or more, such as in roll grinding.

SUMMARY OF THE INVENTION

The present invention, in one form thereof, provides a real time straightness deviation measuring and compensation device for a machine tool in which a straightness reference is scanned during operation of the machine tool along its travel path wherein the machine tool is continuously adjusted to compensate for bed way deviation whereby the machine tool is kept in an exact straight line along its travel path.

A real time straightness deviation measuring and compensation device for a machine tool acting on a workpiece is shown. The measuring and compensation device comprising a bed, a carriage supported by and moveable on the bed, and means for defining a reference line parallel to an axis of rectilinear carriage movement, the means for defining a reference fixed relative on the bed. Further, the device comprises means for determining the position of the carriage relative to the reference defining means as the carriage moves on the bed, the determining means disposed on the carriage, tool support means disposed on the carriage, and compensation means for adjusting the tool support means, whereby the control means automatically compensates the tool support means depending on carriage movement deviation measured by the determining means.

The real time straightness deviation measuring and compensation device includes a bed, resting on a foundation, having bed ways upon which is a movable machine tool carriage. A reference wire is horizontally stretched longitudinal to the bed parallel to the bed ways. A position indication device attached to the machine tool carriage reads the reference wire to determine carriage deviation due to bed way deviation. A computer controlled positioning system for the machine tool is used to monitor and compensate for deviation in real time based on initial machine tool position and input data obtained by the position indication device scanning the reference wire.

It is thus an advantage of the present invention that carriage deviation due to bed way deviation can be monitored and compensated during real time operation.

It is further an advantage of the present invention that detected deviation is in the order of a few microns.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 2 is a perspective view of the real time straightness deviation measuring and compensation device utilized with a machine tool roll grinder, including a schematic representation of the control logic.

Figure 1:
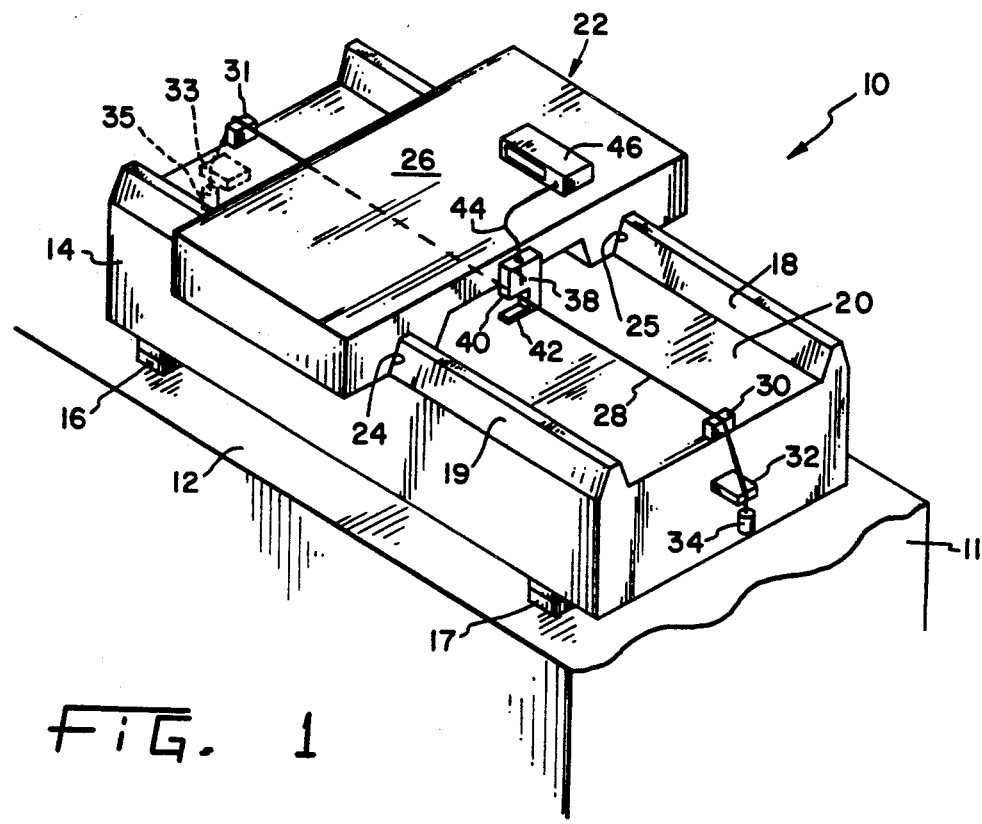
FIG. 1 is a perspective view of the real time straightness deviation measuring device incorporated on a machine tool carriage and bed.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

Referring to FIG. 1, there is shown a machine tool support structure 10 resting on a foundation 11 having a top surface 12 supporting a bed 14. Bed 14 includes four leveling legs of which only two are shown 16, 17 that enable bed 14 to be leveled in the horizontal plane. Thus, by variously adjusting the leveling legs, the bed will be level regardless of the levelness of foundation top surface 12.

Bed 14 has two parallel ways 18 and 19 longitudinally extending the entire length of bed 14, that define trapezoids in cross section. Ways 18 and 19 are disposed on either side of bed 14 essentially forming side walls with a flat bed table 20 therebetween. A carriage 22 extends transverse to the longitudinal length of bed 14 and has on its underside two trapezoidal-shaped bed way grooves 24 and 25 which correspond to the shape of ways 18 and 19 such that carriage 22 is moveable along ways 18 and 19 in either direction. Carriage 22 also defines on its upper side a flat carriage platform 26 on which a tool 48 (see FIG. 2) is supported.

Longitudinally extending from one end to the other of bed table 20 and underneath carriage 22 is a wire 28 horizontally fixed in position by wire guide pairs 30, 32, and 31, 33. Wire 28 is preferably a very thin or fine wire on the order of about 0.007 inches in diameter, although other diameters may be used for the below reasons. As an example, piano treble wire, size 3/0, from Schaff Piano Supply Co., Lake Zunich, Ill. may be used. Wire 28 should be able to withstand exerted tension sufficient to preclude or significantly reduce sagging over the entire longitudinal length, which can be significant in applications such as roll grinding where the roll being ground is on the order of 8 to 12 meters long. Wire 28 longitudinally extends beyond bed 20 on either side where both ends are attached to sufficiently heavy weights 34 and 35 so that, through gravity, the mass of the weights exerts a tensioning force on the wire to keep it straight and without sag. Thus, horizontally stretched wire 28 is utilized as an absolute straightness reference line in the horizontal plane that is independent of the bed ways 18, 19, and carriage 22. In addition, a horizontally stretched wire as a reference is utilizable as long as the scan reference is perpendicular to the direction of gravity to eliminate the effects of sag, as is the case in the present invention.

It is essential that wire 28 be initially oriented on bed table 20 exactly parallel to the rectilinear carriage path or to the axis of workpiece rotation 36 (see FIG. 2) to ensure that the wire 28 is a true reference line so deviations in carriage travel from a t rue workpiece parallel due to aberrations in the bed ways 18, 19 are detected and compensated for as described below. Ways 18, 19 are initially constructed or oriented so that they are parallel to the axis of rotation of the workpiece 36.

In order to utilize wire 28 as a straightness reference line in real time, a reference indication device (RID) 38 is attached to carriage 22 so that RID 38 moves therewith as carriage 22 moves along ways 18, 19. RID 38 is positioned about wire 28 such that it can sense or read the position of wire 28 relative to carriage 22. RID 38 includes a scan head or surface 40 and a read/sensing head or surface 42 sensitive to emanations from scan head 40. Thus, the position of wire 28 within the area of scanning and reading of RID 38 will be known relative to RID 38, as wire 28 will block the scan head emanations from being received by read head 42 while the scan head emanations surrounding wire 28 will be received by read head 42. Since RID 38 is attached to carriage 22, the position of wire 28 relative carriage 22 will also be known. In this manner, as carriage 22 moves along ways 18, 19 signals produced by read head 42 resulting from the receipt of emanations from scan head 40 are communicated through lead 44 to an electronic signal processor or computer 46 for decoding and/or displaying of the produced signals. The decoded and/or displayed signals indicate the position of wire 28 along read head 42, so that a change in position of wire 28 relative to read head 42 as carriage 22 moves along ways 18, 19 is displayed to the operator. A more detailed explanation of the operation of the present invention is presented below in connection with the application of a roll grinder machine tool. It should be appreciated that the present invention may be utilized with any type of tool in applications which necessitate compensation of the tool in a direction transverse to carriage movement.

A known RID and utilized in the preferred embodiment of the present invention, although other RID's may be used, is the Keyence* laser scan micrometer manufactured by the Keyence Corporation of America. The Keyence* laser scan micrometer utilizes a semiconductor laser (670 nm) for its scan head 40 and a laser sensitive read head 42. The emanation from scan head 40, in the case of the Keyence* laser scan micrometer, is laser radiation that impinges upon read head 42 and produces a signal indicating where along read head 42 the laser radiation impinges. Those points of read head 42 that are not impinged by laser radiation, do not produce a signal and thus the position of wire 28 is read by the Keyence* micrometer along its read head 42 through signal decoding by electronic signal processor 46. If wire 28 moves within RID 38, the read head sensors will signal the shift in position through radiation impinging on different parts along the read head 42.

Now, referring to FIG. 2, a roll grinder machine tool 48 having a housing 50 is shown supported on carriage platform 26. Roll grinder machine tool 48 is moveable relative to carriage platform 26 in a direction transverse to the direction of carriage movement, as described hereinbelow. A rotatable grinding wheel 52 for grinding a predetermined profile 54 on a roll 56 is rotatable about axle 53 being supported, for example, by bearings (not shown) in housing 50. Housing 50 along with grinding wheel 52 is moveable transverse to the direction of carriage travel both towards and away from roll 56 depending on the desired predetermined roll profile and error compensation, if any, as determined by the present invention.

In the embodiment shown, a servo drive system 58 comprising a reversible drive motor 60 having an armature 62, a screw gear 61 extending into and driven by motor 60 and connected to a block 63 attached to housing 50, and an associated tachometer 64 for measuring motor velocity and direction of velocity is disposed on carriage surface 26 for moving tool 48. Block 63 is integral with housing 50 or the tool such that its movement will likewise cause movement of housing 50 or the tool on surface 26. Movement of block 63 and thus housing 50 or the tool, is thus accomplished by servo drive system 58. Reversible motor 60 includes an internal gear (not shown) which meshes with screw gear 61 in a conventional manner such that movement of motor 60 in one rotative direction rotates screw gear 61 and block 63 outwardly, while an opposite rotative direction of motor 60 rotates screw gear 61 and block 63 inwardly. Since screw gear 61 is fixedly connected to block 63 of housing 50, housing 50 moves in the direction of screw gear rotation. Housing 50 also includes an electronic position feedback scale 66 that generates a signal indicative of the position of the housing, and thus grinding wheel 52, relative to a selected reference point. Feedback scale 66 is a positional indicator of tool 48 relative to carriage surface 26.

The compensation device of the present invention can be automatically controlled by a microprocessor or computer (not shown) that utilizes a control structure as diagrammatically depicted in FIG. 2, or a functionally equivalent control structure. The control structure essentially consists of a position control block 68, that can be computer software, discrete hardwired components with an input interface where needed, or a combination thereof, coupled by lead 70 to a servo drive control block 72 that also can be computer software or hardwired components. Position control block 68 receives a straightness deviation signal from signal processor 46 via lead 74 and a desired part (roll) profile position command signal via lead 76 inputted according to the particular application by computer software or the like. The exact positioning of signal processor 46 in the device is not critical, as long as its positioning does not interrupt the operation of the device. Signal processor 46 is shown located on the side of bed 14 in FIG. 3, and on surface 26 of carriage 22 in FIG. 1.

A differential amplifier 78, or the software equivalent, compares the two signals from leads 74 and 76 and outputs via lead 80 the difference of the inputs as a straightness corrected position command signal. The straightness corrected position command signal from lead 80 and an actual grinder position signal from position feedback scale 66 via lead 82 are compared by differential amplifier 84, or the software equivalent, which generates a position error signal. This signal is fed into a proportional integration device (PID) 86 for processing before being inputted via lead 70 into servo drive control block 72.

In position control block 68 the predetermined application specific part profile position is checked against the deviation signal produced by RID 38 and generates a straightness corrected position signal which is compared against the actual position of the grinding wheel 52. The position error signal is sent to the servo control block 72 as a velocity signal wherein it is compared by differential amplifier 88, or the software equivalent, with the velocity feedback signal as measured by tachometer 64 via lead 90. A velocity signal is fed into PID 92, wherein the velocity signal is converted into an unprocessed torque command signal. Lead 94 inputs the unprocessed torque command signal into current loop 96. From current loop 96, a motor output signal is sent via lead 98 to armature 62. Armature 62 controls motor 60 which thus moves housing 50 and grinding wheel 52 thereby affecting the roll profile 54. The motor output signal indicates to armature 62 the motor drive direction and/or the velocity of direction change. Tool 48 is thus compensated for in real time.

Figure 3:
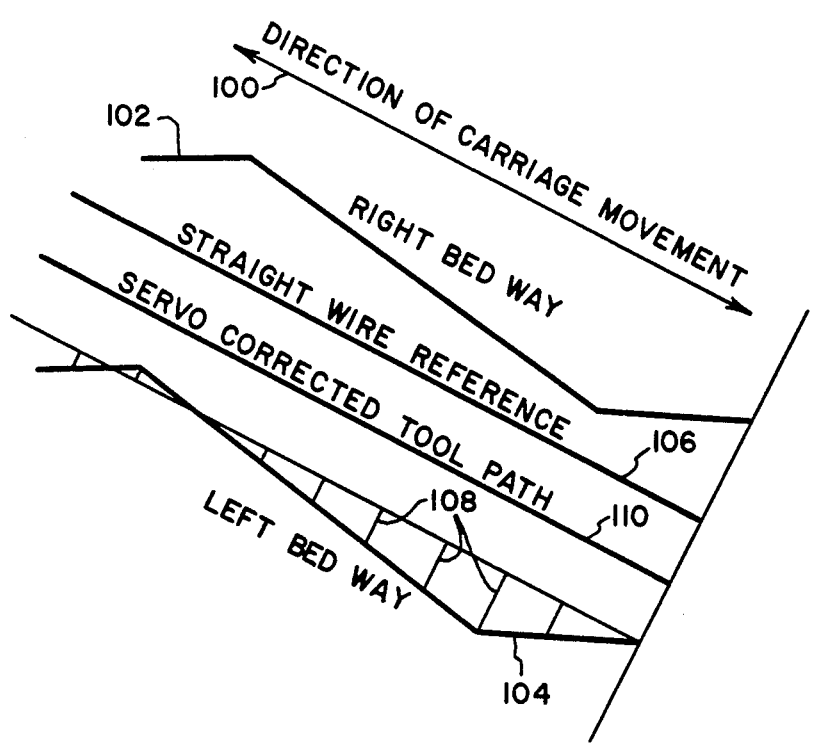
FIG. 3 is a graphic representation of the compensation of the carriage relative to a straight reference and deviating bed ways.

In operation, and referring to FIGS. 2 and 3, the present invention grinds a profile 54 on a roll 56 and compensates for misalignment during real time as follows. Depending on the application and the type of workpiece, an initial specific roll profile is desired which is inputted into the computer position control block to determine the initial position of grinding wheel 52 relative to roll profile 54. As carriage 22 travels along bed ways 18, 19 in the direction labelled 100 in FIG. 3, grinding wheel 52 shaves or takes off a certain amount from roll 56. FIG. 3 depicts right and left bed way paths 102, 104 being out of alignment with wire reference path 106 that is parallel with the axis of workpiece rotation, as described above. If carriage 2 follows the path dictated by right and left bed ways, the roll would end up with a profile according to the profile established by the right and left bed ways. The deviation values 108 are generally on the order of a few microns, but such values are not acceptable when the roll is applied to certain applications, thus it is necessary that even these small deviation values be compensated during roll grinding or other machine tool applications.

RID 38 monitors the position of reference wire 28 as described above and generates a signal that is decoded and translated by electronic signal processor 46. The signal is then sent to differential amplifier 78 of position control block 68. If the signal received from electronic signal processor 46 differs from a predetermined initial signal signifying a straight position, labelled in FIG. 2 as desired part profile position command, the position control block 68 produces a straightness corrected position command. The command is compared with the actual position of tool 48 and thus grinding wheel 52 via lead 82 from position feedback scale 66 attached to housing 50. In the case of a necessary correction, position error velocity command is sent via lead 70 to servo control block 72. The error position velocity command is then compared with the actual velocity of motor 60 through tachometer 64 via lead 90 and a signal is sent via lead 98 to armature 62 to adjust motor 60 and thus the position of housing 50 or the tool relative to carriage surface 26.

Thus, the deviation measuring and compensation device of the present invention measures the deviation encountered by the carriage 22 during its travel path and compensates for the deviation by adjusting the housing and grinding wheel accordingly, during real time operation of the machine tool.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A real time straightness deviation measuring and compensation device for a machine tool acting on a workpiece, the measuring and compensation device comprising:

a bed having a bedway;

a carriage supported by said bedway for rectilinear movement thereon, said carriage having said machine tool movably supported on an upper surface thereof;

a reference line aligned parallel to an axis of desired rectilinear carriage movement, said reference line being independent of said bedway and fixed relative to said bed;

means for determining deviation of movement of said carriage in a direction transverse to said reference line during said rectilinear movement; and compensation means responsive to said determining means for controllably moving said machine tool relative to said carriage in response to measured deviation of movement of said carriage from said reference line.

2. The device of claim 1, wherein said compensation means controllably moves said machine tool in a direction transverse to said rectilinear movement of said carriage.

3. The device of claim 1, wherein said determining means is a laser micrometer.

4. The device of claim 1, wherein said determining means is disposed on said carriage.

5. The device of claim 1, wherein said reference line is a wire.

6. The device of claim 5, further including tensioning means for inducing straightness in said wire.

7. The device of claim 6, wherein said wire has ends extending beyond said bed, and said tensioning means includes a weight attached to each said extending end for creating a gravity induced tension.

8. The device of claim 1, wherein said machine tool is a roll grinder.

9. The device of claim 1, wherein said determining means is operable to generate a signal indicative of the amount of orthogonal deviation of said carriage relative to said reference line.

10. The device of claim 9, wherein said compensation means comprises:

servo means attached to said machine tool for moving said machine tool in a direction transverse to said rectilinear movement, said servo means including means for producing a servo velocity signal;

first means for comparing said carriage position signal with a predetermined part profile position signal, and producing a straightness corrected position signal thereby;

means for indicating the position of said machine tool relative to said carriage and generating a tool position indication signal;

second means for comparing said straightness corrected position signal with said tool position indication signal, and producing a position error velocity signal thereby; and third means for comparing said position error velocity signal with said servo velocity signal, and generating a drive signal thereby;

said servo means responsive to said drive signal whereby said machine tool is moved by said servo means in response thereto.

11. The device of claim 10, wherein said servo means comprises:

a motor;

gear means operably connected to said motor and said machine tool for translating rotational motor movement into transverse machine tool movement; and an armature connected to said motor for receiving said drive signal and controlling said motor.

12. A real time straightness deviation measuring and compensation device for a machine tool acting on a workpiece, the measuring and compensation device comprising:

a bed having a bedway;

a carriage supported by said bedway for rectilinear movement thereon, said carriage having said machine tool supported for orthogonal movement relative said rectilinear movement on an upper surface thereof;

a reference line aligned parallel to an axis of desired rectilinear carriage movement, said reference line being independent of said bedway and fixed relative to said bed;

means disposed on said carriage for determining deviation of movement of said carriage in a plane horizontally orthogonal to said reference line during said rectilinear movement; and compensation means coupled to said determining means for controllably moving said machine tool relative to said carriage in a plane horizontally orthogonal to said rectilinear movement in response to deviation of movement of said carriage from said reference line as measured by said determining means.

13. The device of claim 12, wherein said determining means is a laser micrometer.

14. The device of claim 12, wherein said reference line is a wire.

15. The device of claim 14, further including tensioning means for inducing straightness in said wire.

16. The device of claim 15, wherein said wire has ends extending beyond said bed, and said tensioning means includes a weight attached to each said extending end for creating gravity induced tension.

17. The device of claim 12, wherein said machine tool is a roll grinder.

18. The device of claim 12, wherein said determining means is operable to generate a signal indicative of the amount of orthogonal deviation of said carriage relative to said reference line.

19. The device of claim 18, wherein said compensation means comprises:

servo means attached to said machine tool for moving said machine tool in a direction transverse to said rectilinear movement, said servo means including means for producing a servo velocity signal;

first means for comparing said carriage position signal with a predetermined part profile position signal, and producing a straightness corrected position signal thereby;

means for indicating the position of said machine tool relative to said carriage and generating a tool position indication signal;

second means for comparing said straightness corrected position signal with said tool position indication signal, and producing a position error velocity signal thereby; and third means for comparing said position error velocity signal with said servo velocity signal, and generating a drive signal thereby;

said servo means responsive to said drive signal whereby said machine tool is moved by said servo means in response thereto.

20. The device of claim 19, wherein said servo means comprises:

a motor;

gear means operably connected to said motor and said machine tool for translating rotational motor movement into transverse machine tool movement; and an armature connected to said motor for receiving said drive signal and controlling said motor.

* * * * *